Feb. 7, 1933.  C. J. BARRY  1,896,277
BUMPER ATTACHMENT
Filed Feb. 23, 1932  2 Sheets-Sheet 1
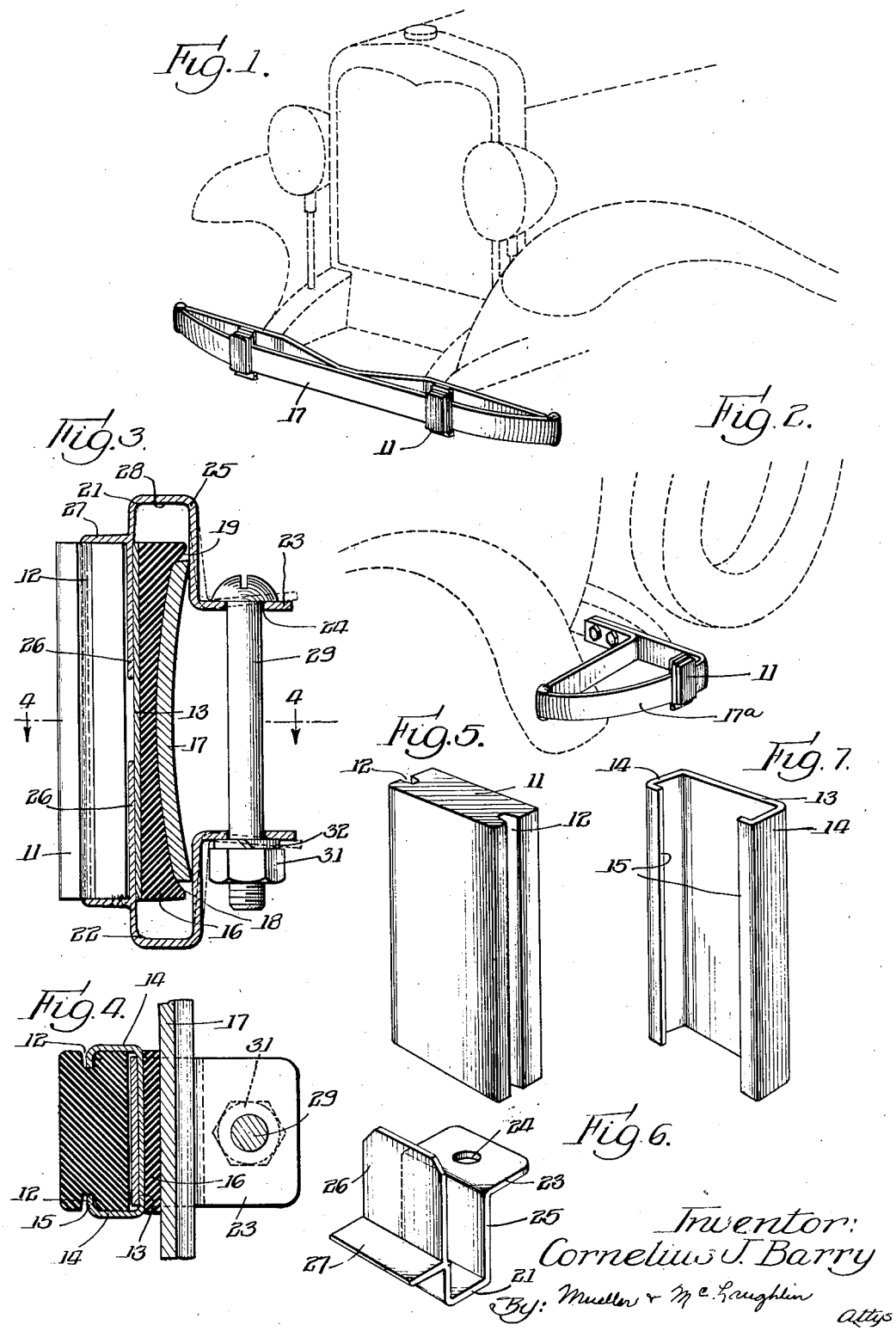
Inventor:
Cornelius J. Barry
By: Mueller & McLaughlin
Attys Feb. 7, 1933.  C. J. BARRY  1,896,277
BUMPER ATTACHMENT
Filed Feb. 23, 1932  2 Sheets-Sheet 2
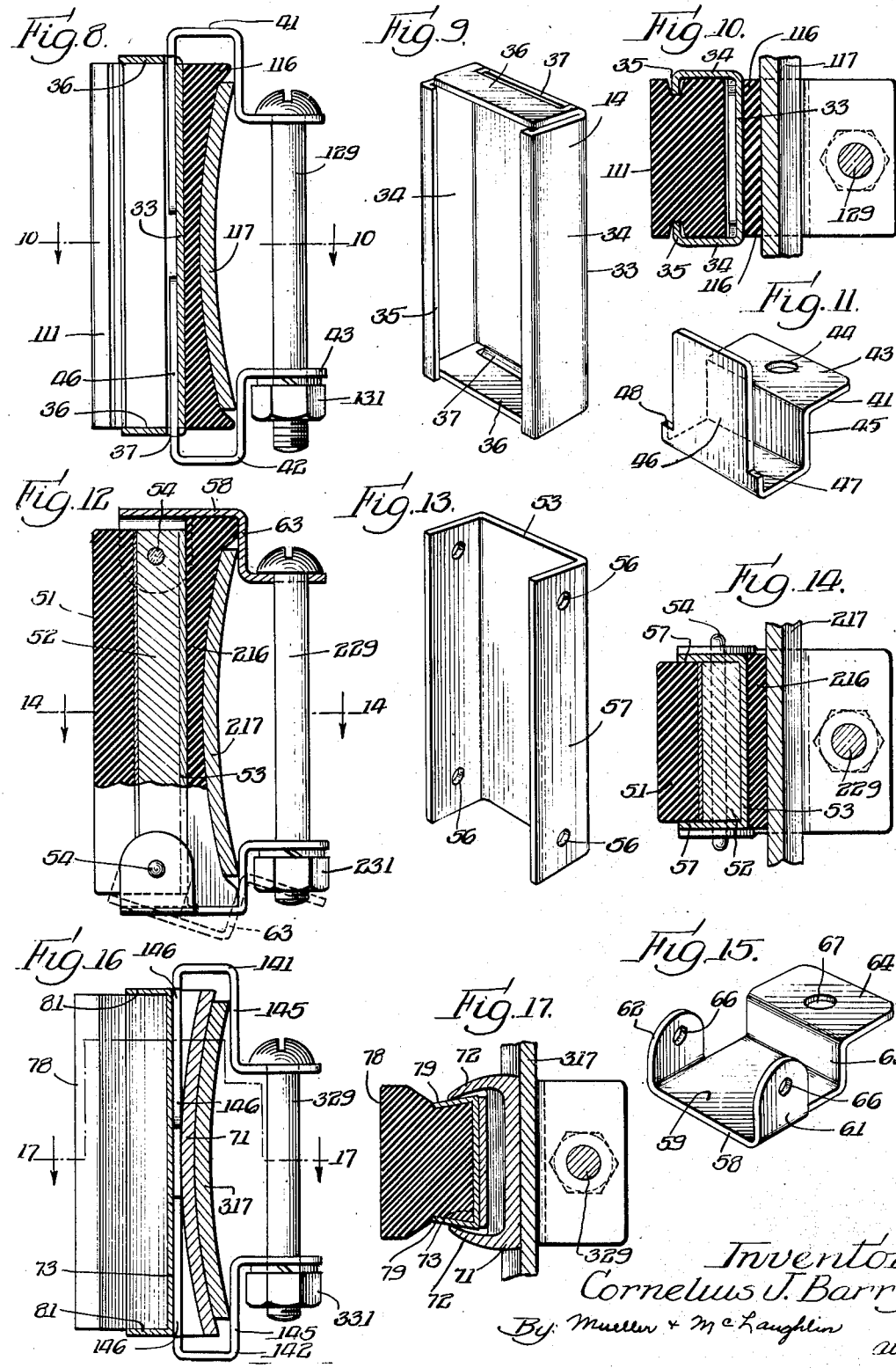

Patented Feb. 7, 1933

1,896,277

UNITED STATES PATENT OFFICE

CORNELIUS J. BARRY, OF CHICAGO, ILLINOIS

BUMPER ATTACHMENT

Application filed February 23, 1932. Serial No. 594,619.

My invention relates in general to automobile bumpers and more in particular to a bumper attachment adapted to act as a buffer in preventing scratching of the polished finish on the bumper.

At the present time automobiles are being equipped with bumpers on the front and rear, in most cases finished in a chrome or nickel plating. In this particular as well as in the manufacture of the automobile itself, greater attention is being devoted to the production of a highly polished product. The appearance of the finished automobile is being stressed, and the enamelling and plating is being improved so as to give longer life to the polished appearance than ever before. The bumpers on the front and rear of the car are more subject to scratching and marring than any other part of the body of the car, for it is the purpose of the bumpers to so protect the body of the car from damage. Being subject to this treatment the bumpers are apt to lose their polished appearance before any other part of the automobile, and thus detract from the appearance of the whole.

An object of my invention is to provide a device readily attachable to an automobile bumper, and constructed to act as a buffer to protect the bumper from damage.

A feature of my invention is the provision of a bumper device of the above character having a vertically disposed pad retaining member with attaching clamps supported at the upper and lower ends thereof for embracing the bumper bar and constructed or attached in such a manner as to have pivotal movement so that a single vertically disposed clamping bolt passing therethrough will effect a pivotal movement of the clamps to firmly secure the device to the bar.

Other objects and advantages will appear as the description proceeds.

Referring to the drawings:

Fig. 1 is a perspective fragmentary view of the front of an automobile showing my invention attached to the front bumper;

Fig. 2 is a perspective fragmentary view of the rear of an automobile with my device attached to a rear bumper;

Fig. 3 is a side elevation, partly in section of the bumper attachment;

Fig. 4 is a transverse view along the line 4—4 of Fig. 3;

Fig. 5 is a perspective of the rubber buffer pad of the device;

Fig. 6 is a perspective of one of the end clamps from my bumper attachment;

Fig. 7 is a perspective view of the flanged plate;

Fig. 8 is a side elevation, partly in section, of a modification of my invention;

Fig. 9 is a perspective view of the buffer pad retaining box of Fig. 8;

Fig. 10 is a transverse sectional view along the line 10—10 of Fig. 8;

Fig. 11 is a perspective view of one of the end clamps used in the device of Fig. 8;

Fig. 12 is a side elevation, partly in section of a further modification;

Fig. 13 is a perspective view of the flanged plate of Fig. 12;

Fig. 14 is a transverse sectional view along the line 14—14 of Fig. 12;

Fig. 15 is a perspective view of an end clamp of Fig. 12;

Fig. 16 is a side elevation partly in section of a further modification; and

Fig. 17 is a transverse sectional view along the line 17—17 of Fig. 16.

In accomplishing the invention I provide a buffer pad held in a flanged plate, with clamps on both ends, apertured for receiving a bolt for drawing the clamps together and thus securely attaching the device to a bumper. A resilient pad is also provided, secured to the outer face of the flanged plate for engaging the polished surface of the bumper, serving to protect the polished surface from scratching by attachment of the device, and also to frictionally engage the bumper to prevent movement thereon.

The bumper attachment as shown in Figs. 1 and 3 secured to an automobile bumper comprises a resilient rubber buffer pad 11, having grooves 12 on both sides. The pad 11 is inserted in a rectangular plate 13, with vertically extending flanges 14 formed on both sides, having inturned flanges 15 thereon which fit into the grooves 12 cut in the sides of the buffer pad. The buffer pad 11 is dimensioned so as to provide a slight open space between the plate 13 and its inside surface. A resilient clamping pad 16 is cemented to the outer face of the plate 13, or secured in any other desired manner, and is adapted to fit against the polished surface of the bumper 17 or 17a. One side of the pad 16 is flat to fit tightly against the outer surface of the plate 13 to which it is secured while the other side is curved slightly to conform to the shape of the outside of the bumper. The end portions 18 and 19 have a greater degree of curvature than the center of the pad, so that these end points will frictionally engage the outside surface of the bumper 17, regardless of slight variations in shape of this outside surface and aid in holding the device in position on the bumper 17.

A substantially U-shaped clamp 21 is provided for fitting at one end of the plate 13, and an identical clamp 22 is provided at the other end. Considering clamp 21, for instance, one leg 25 of the U-shaped portion thereof has a rearwardly extending flange 23 at its end (Fig. 6), having an aperture 24 for receiving the clamping bolt 29. The other leg 26 of the U-shaped clamp 21 has a forwardly extending stop flange 27 preferably integral therewith, extending at a right angle thereto and intermediate its ends. The bolt 29, with a nut 31 to be screwed thereon is provided for inserting through the aperture 24 in the clamp 21, and a corresponding aperture in the clamp 22, for the purpose of drawing the two clamps together and securing the device to the bumper.

In applying the bumper attachment, the flanged plate 13 with the rubber buffer pad 11 secured therein, and the rubber clamping pad 16 on the outside surface thereof, is placed against the bumper 17 or 17a (Fig. 2) in the desired position with the clamping pad 16 resting against the polished surface of the bumper. An end clamp 21 is fitted over the edge of the bumper 17, and the arm 26 of the clamp inserted into the space between the pad 11 and the plate 13, with the stop flange 27 abutting the end of the buffer pad 11. The clamp 22 is similarly fitted over the lower edge of the bumper 17, as shown in Fig. 3. Thus the two clamps 21 and 22 embrace the bumper bar with the clamping flanges 23 extending rearwardly to receive the clamping bolt. The bolt 29 is then inserted through the apertures 24 in the clamps 21 and 22, with a lock-washer 32 in place over the end of the bolt and the nut 31 screwed thereon. By drawing the clamps 21 and 22 the legs 25 are pivotally swung inwardly from the dotted to full line position indicated in Fig. 3, thereby drawing these legs and the resilient pad 16 against the bumper bar 17 and frictionally holding the attachment thereon.

The ends 18 and 19 of the pad 16 further grip the edges of the bumper thereby assisting in holding the attachment against displacement. This clamping action makes it possible to secure the device to a bumper bar, using only a single bolt, and without drilling a hole in the bar for the insertion of said bolt. The buffer pad 11 is secured in the flanged plate 13 by means of the inturned flanges 15 fitting in the grooves 12 formed in the pad, and by means of the flange 27 and the similar flange on the clamp 22 abutting both ends. The bumper attachment is thus prevented from moving vertically or longitudinally on the bumper and at the same time held in a manner such that it cannot scratch or mark the chrome or nickel plated surface of the same.

In the embodiment of the invention shown in Figs. 8 to 11, the same result is obtained with a slightly different structure. The buffer pad 111 identical with buffer pad 11 is secured in an oblong box 33 having vertical flanges 34 on the sides thereof extending to inturned flanges 35, adapted for fitting into the grooves of the pad. The pad 111 is held from vertical movement when the device is secured to a bumper bar by end pieces 36 formed integral with the bottom of the box (Fig. 9). Slots 37 are cut in each end piece 36 adjacent the bottom of the box. A resilient clamping pad 116, identical with clamping pad 16 is cemented to the outer surface of the box 33 in the manner and for the purpose described in connection with the structure of Fig. 3.

The buffer element is held in position on the bumper bar 117 by means of end clamps 41 and 42 inserted therein, being drawn together by means of bolt 129 cooperating with clamping pad 116. The end clamps 41 and 42 each is substantially U-shaped with one leg 45 having a rearwardly extending flange 43 (Fig. 11), the latter apertured at 44 for receiving the clamping bolt 129. The other leg 46 is notched at 47 and 48 and adapted for inserting in the slot 37, to fit under the buffer pad 111, to a depth so that the notches 47 and 48 abut the end piece 36.

The device is attached to a bumper bar in the same manner as the embodiment illustrated in Fig. 3. The nut 131 is turned on the bolt 129, drawing the end clamps 41 and 42 together, and pivoting them so that the legs 45 bear against the back of the bumper bar, and the resulting pressure on the legs 46 clamps the buffer pad to the front of the bar.

A further modification is illustrated in Figs. 12 to 15. In this embodiment the buffer pad 51 is cemented or secured to a wooden block 52 in any desired manner, the block in turn being held in a flanged plate 53, by means of pins 54 extending through apertures 56 in the vertical flanges 57 on each side of the plate 53, and through apertures in the wooden block 52 (Fig. 14). A wooden block 52 is used because it is inexpensive, is light, and presents a surface to which the rubber buffer pad 51 may be readily cemented. A resilient clamping pad 216 is secured to the under side of the flanged plate 53, in the same manner as heretofore described.

End clamps 58 are provided which are pivotally connected to the body of the device by means of the pins 54. Each clamp 58 comprises a body portion 59 with vertically extending ears 61 and 62 on the outer edges thereof, a downwardly extending leg 63, and a rearwardly extending flange 64. The ears 61 and 62, have apertures 66 adapted for fitting on the pins 54 for pivotal movement of the end clamps.

The buffer pad is secured to the bumper bar 217 in a manner similar to that heretofore described. End clamps 58 are pivoted to a position shown by the dotted lines in Fig. 12 and extended over the edges of the bumper bar, with the resilient clamping pad 216 resting against the outer face of the bar. The clamps 58 are then clamped down to the full line position shown in Fig. 12, with the legs 63 bearing against the back of the bumper. By means of a bolt 229 inserted through apertures 67 in the flanges 64 of the clamps, and a nut 231 turned thereon, the end clamps 58 are drawn together, and the buffer pad clamped to the bumper bar.

Figs. 16 and 17 illustrate a still further modification of the invention. In this embodiment a flanged clamping plate 71 is provided having a body portion curved to conform to the curvature of the outside surface of the bumper bar 317, and adapted to fit smoothly and tightly against this surface. The flanges 72 on the clamping plate 71 extend forwardly and inwardly as illustrated in Fig. 17, to grip the box 73 in which the buffer pad 78 is secured. The rubber buffer pad 78 is cut in at its base as illustrated in Fig. 17, so as to slide into the box 73 whose sides 79 extend forwardly and inwardly to grip the lower portion of the buffer pad, and hold it therein. The ends 81 of the box are bent forwardly to abut the ends of the pad and hold it from vertical movement.

In securing the buffer device to the bumper bar, the buffer pad 78 secured in the box 73 is inserted in the clamping plate 71, leaving a space between the bottom of the box and the face of the clamping plate as shown in Fig. 16. The legs 146 of the clamps 141 and 142 identical with clamps 41 and 42 heretofore described, are inserted in the open space between the clamping plate and box, with the clamps extending over the edges of the bumper bar 317. As previously described the clamps are drawn together by the nut 331 turning on the bolt 329, and forcing the legs 145 of the clamps against the back of the bumper bar. As a result of the pivotal movement of the clamps as they are drawn together, and the legs 145 bearing against the back of the bumper, pressure is brought to bear on the clamping plate 71 by the legs 146 clamping said plate against the bumper bar. At the same time an outward pressure is exerted by the legs 146 against the bottom of the box 73 forcing the same outwardly so that the inturned edges of the flanges 72 on the clamping plate grip the box 73 and prevent the buffer element from moving.

The bumper attachment is placed on the front and rear bumper of the automobile in a position such that the rubber buffer pad extends beyond the surface of the bumper in the outermost point in its curvature, if curved, or conveniently spaced from the ends of the bumper if straight across. The bumper attachment presses against a bumper or portion of another vehicle so as to prevent the polished surface of the bumper to which it is attached from becoming scratched.

In addition the bumper attachment as illustrated in its various embodiments herein described, is of a simple, graceful design, and adds to the artistic appearance of the bumper, and of the automobile to which it is secured.

It is also understood that the embodiments of the invention herein described and disclosed are merely convenient and useful forms of the invention and that other modifications and changes may be made without departing from the spirit and scope of the invention.

What I claim as new and desire to protect by United States Letters Patent is:

1. In a buffer device for attachment to an automobile bumper bar, a vertically disposed buffer pad retaining member, attaching clamps pivotally supported at the upper and lower ends of said member and extending rearwardly over the bumper bar, and a vertically disposed clamping bolt extending through the rearward extensions for drawing said extensions together to clamp said member to the bar.

2. In a buffer device for attachment to an automobile bumper bar, a vertically disposed buffer pad retaining member, attaching clamps supported at the upper and lower ends of said member including rearward extensions to embrace the bumper bar, a clamping bolt extending through the rearward extensions, and said extensions having pivotal movement whereby said bolt will draw them together to clamp said member to the bumper bar.

3. In a device for attachment to an automobile bumper, a buffer plate, a buffer pad secured thereto, a clamp at each end of the buffer plate extending over the bumper bar, and a bolt extending through the clamps for drawing said clamps together over the bumper bar.

4. In a device for attachment to an automobile bumper, a buffer pad supporting member, a clamp composed of two identical oppositely disposed members extending rearwardly over the bumper bar, and means for drawing said members together for detachably securing said supporting member to the bumper bar.

5. In a device for attachment to an automobile bumper, a buffer pad supporting member, a clamp composed of two identical oppositely disposed members at the upper and lower ends of the member for fitting over the upper and lower edges and along the rear face of the bumper bar, each of said members having a rearwardly extending flange, and a clamping bolt extending vertically along the rear of the bumper bar through said flanges for drawing the flanges together to press the clamping members against the rear of the bumper bar to hold the device in position on the bumper bar.

6. In a device for attachment to an automobile bumper, a plate, a buffer pad secured to one side and a resilient clamping pad secured to the other side thereof, end clamps adapted for fitting over the bumper and abutting the ends of the buffer pad, and means including said end clamps for detachably securing said device to the bumper.

7. In a device for attachment to an automobile bumper, a flanged plate, a buffer pad secured thereto, a pair of oppositely disposed clamps abutting the ends of the buffer pad adapted for fitting over the bumper bar, said clamps each comprising a U-shaped portion with a pair of legs, one of said legs having a rearwardly extending flange at its end, and the other leg having a forwardly extending stop flange intermediate its ends for abutting the end of the buffer pad, and a clamping bolt for said rearwardly extending flanges for drawing said clamps together whereby the device is detachably secured to the bumper bar.

8. In a device for attachment to an automobile bumper, a plate having forwardly extending flanges, a buffer pad secured to one side of said plate and a resilient clamping pad secured to the other side thereof, pins extending through the forwardly extending flanges, end clamps pivotally secured on said pins adapted for fitting over the bumper and abutting the ends of the buffer pad, and a bolt extending through the clamp for drawing said clamps together over the bumper bar.

9. In a device for attachment to an automobile bumper, a buffer pad supporting member, a flanged clamping plate for resting against the outer surface of the bumper bar, and adapted for gripping said supporting member therein, end clamps supported at the upper and lower ends of said clamping plate including rearward extensions to embrace the bumper bar, a clamping bolt extending through the rearward extensions, and said extensions having pivotal movement whereby said bolt will draw them together to clamp said plate to the bumper bar.

10. In a buffer device for attachment to an automobile bumper bar, a vertically disposed buffer pad retaining member, attaching clamps supported by said member at its upper and lower ends, said clamps including rearward extensions to embrace the bumper bar, clamping means extending through the rearward extensions, and said clamps having pivotal movement whereby said clamping means will draw said extensions together to secure said buffer and member to the bumper bar.

In witness whereof, I hereunto subscribe my name this 10th day of February, 1932.

CORNELIUS J. BARRY.